L. A. WHITE & G. W. LEWIN.
TEA-KETTLE.

No. 187,690. Patented Feb. 20, 1877.

WITNESSES:

INVENTORS

UNITED STATES PATENT OFFICE.

LEONARD A. WHITE AND GEORGE W. LEWIN, OF NORTH DIGHTON, MASS., ASSIGNORS TO THEMSELVES AND JOSEPH B. WARNER, OF SAME PLACE.

IMPROVEMENT IN TEA-KETTLES.

Specification forming part of Letters Patent No. 187,690, dated February 20, 1877; application filed January 6, 1877.

*To all whom it may concern:*

Figure 1:
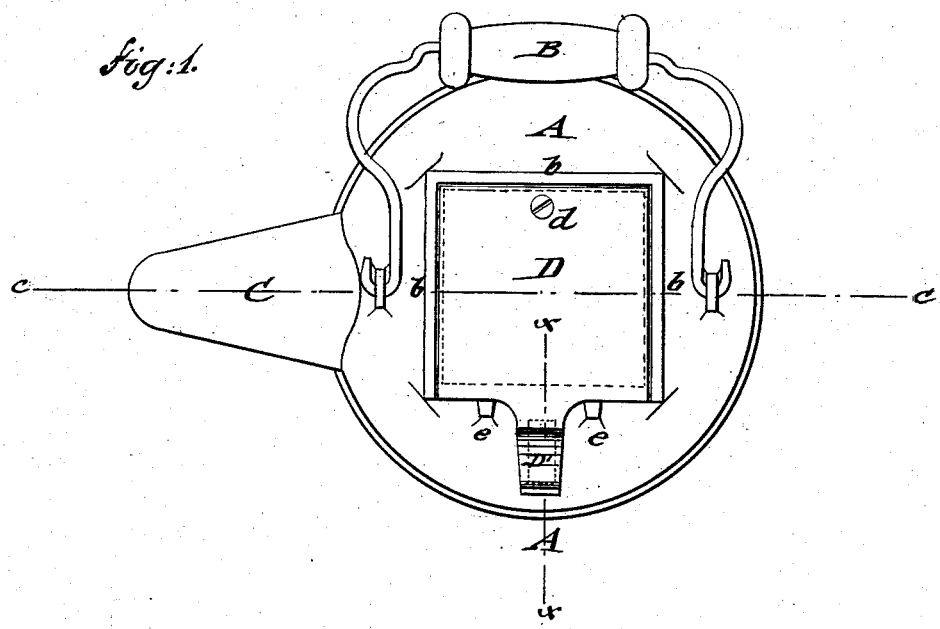
Figure 2:
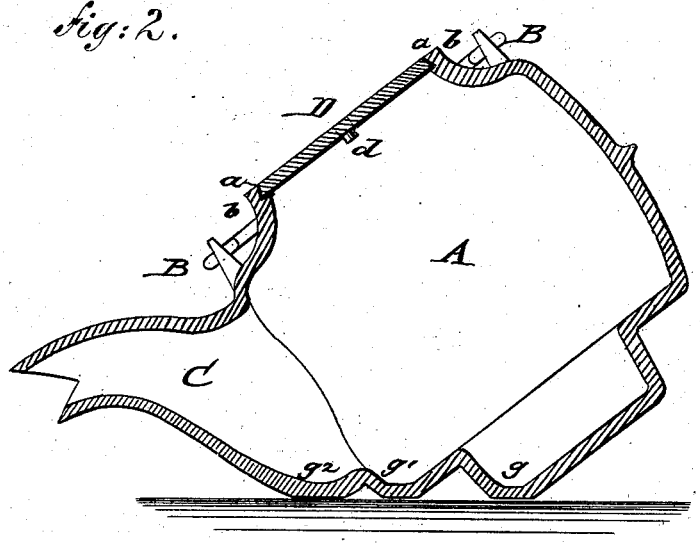
Figure 3:
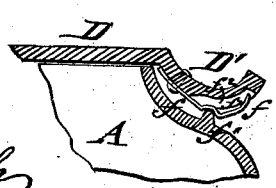

Be it known that we, LEONARD A. WHITE and GEORGE W. LEWIN, of North Dighton, in the county of Bristol and State of Massachusetts, have invented a new and Improved Tea-Kettle, of which the following is a specification:

In the accompanying drawing, Figure 1 represents a plan view, and Fig. 2 a vertical longitudinal section on line $c$ $c$, Fig. 1, of our improved tea-kettle, the latter figure showing the kettle in inclined self-supporting position for pouring out the contents; and Fig. 3 is a detail vertical transverse section on line $x$ $x$, Fig. 1, of the spring-catch of lid.

Similar letters of reference indicate corresponding parts.

The invention relates to such improvements in tea-kettles that the lid can be conveniently opened and tightly closed without any rattling or escape of steam, and that the kettle may be tilted and supported in forward inclined position, for the more convenient pouring out of hot water without annoyance from escaping steam.

The invention consists of a laterally sliding and guided lid, secured in closed position by a spring-catch of its handle to a lug or seat of the kettle; and it consists, further, of flattened off parts or seats of the bottom, body, and spout of the kettle, to support the same in inclined position.

In the drawing, A represents a tea-kettle, of the usual size and material, with a swinging handle, B, and spout C. A laterally-sliding lid, D, with beveled edges $a$, is guided in a correspondingly-recessed rim, $b$, of the square or oblong opening of the kettle, and opened by means of a downwardly-curved handle, D′. A screw-pin, $d$, is applied to the lid at the end opposite to the handle D′, and made to project below the under side of the same, for the purpose of serving as a stop to prevent the withdrawing of the lid out of the guide-rim $b$. Projecting seats $e$ of the kettle A, sidewise of the handle D′, and level with the under side of lid B, serve to support the same in horizontal position when drawn out, so as to be readily slid back and closed without catching on the guide-rim. A spring-catch, $f$, at the under side of the handle D′, binds on a lug, $f^1$, of the kettle, and locks the lid in closed position, the spring-catch being raised into a recess, $f^2$, at the under side of the handle, on being taken hold of for opening the lid, so as to release, simultaneously with the pulling back of the lid, the spring-catch from its lug. Thus the lid may be conveniently opened and tightly secured in closed position without the annoying rattling of the swinging or hinged lids, and without the disagreeable escape of steam, that burns the hand in tilting the kettle. Another advantage of the sliding lid is that it forms a seat for any other vessel that may be placed thereon for being kept warm.

The kettle A is flattened or cut off at the points $g$, $g^1$, and $g^2$, respectively, of the bottom edge, body, and spout, the flattened points being in the direction of, but cut transversely to, the longitudinal axis of the kettle, so as to form seats on which the kettle may be supported for pouring out the boiling water, as shown in Fig. 2. This steadies the kettle, and facilitates the pouring of the contents, dispensing with the annoying lateral motion or oscillation of the kettle caused by the pivoted handle.

Having thus described our invention, we claim as new and desire to secure by Letters Patent—

1. The combination, with the sliding cover D of a tea-kettle, of the seats $e$ $e$, arranged substantially as and for the purpose specified.

2. The combination of the kettle A, having lug $f$, with the spring-catch $f^1$, of the recessed lid-handle D′, substantially as described.

3. A tea-kettle, having laterally flattened or cut off portions or seats $g$ $g^1$ $g^2$ at the bottom, body, and spout in the longitudinal axis of the kettle, substantially as shown and described.

LEONARD A. WHITE.
GEORGE W. LEWIN.

Witnesses:
JOHN SHAW,
RICHARD E. WARNER.